United States Patent [19]
Esoldi

[11] 4,183,486
[45] Jan. 15, 1980

[54] HOLDER ARRANGEMENT FOR ELECTRICAL WIRING BOXES

[75] Inventor: Vincent F. Esoldi, Sterling, N.J.

[73] Assignee: Raco Inc., South Bend, Ind.

[21] Appl. No.: 937,046

[22] Filed: Aug. 28, 1978

[51] Int. Cl.² .................. H02G 3/12; H02G 3/18; F16B 5/06
[52] U.S. Cl. ................ 248/205 R; 220/3.5; 248/DIG. 6
[58] Field of Search .......... 248/205 R, 300, DIG. 6, 248/27.1; 220/3.5, 3.6, 3.9

[56] References Cited

U.S. PATENT DOCUMENTS

| | | | |
|---|---|---|---|
| 2,581,755 | 1/1952 | Dieffenderfer | 220/3.6 |
| 2,586,728 | 2/1952 | Shepard | 248/DIG. 6 X |
| 2,635,778 | 4/1953 | Dieffenderfer et al. | 220/3.6 |
| 2,762,591 | 9/1956 | Weber | 248/DIG. 6 X |
| 2,978,135 | 4/1961 | Furnish | 248/DIG. 6 X |
| 3,127,047 | 3/1964 | Bolchalk | 220/3.6 |
| 3,184,191 | 5/1965 | Esoldi | 248/27.1 |
| 3,462,039 | 8/1969 | Gies | 220/3.6 |
| 3,963,204 | 6/1976 | Liss | 248/DIG. 6 X |
| 4,108,414 | 8/1978 | Grant | 248/205 R X |

*Primary Examiner*—J. Franklin Foss
*Attorney, Agent, or Firm*—McWilliams, Mann & Zummer

[57] ABSTRACT

An electrical wiring box holder arrangement of the type shown in Esoldi U.S. Pat. No. 3,184,191, for screwless mounting of the box and wallboard in a box receiving opening formed in the wallboard for that purpose, in which the E shaped holder members that are applied to opposite sides of the box are formed and processed in application so that the holder member center leg and the holder member back portion aligned therewith are shaped to define a centrally located dihedral wall bracing structure that acts in the nature of a girder on being wedged between the side of the box and the wallboard back face, with the box being firmly gripped between the resulting dihedral wall bracing structures of the respective holder members when installation is completed.

11 Claims, 9 Drawing Figures

HOLDER ARRANGEMENT FOR ELECTRICAL WIRING BOXES

This invention relates to holders for mounting electrical wiring boxes, such as outlet and switch boxes, in wallboard free of screw type connections to the wallboard, and more particularly, to improvements in the holder and method disclosed in my U.S. Pat. No. 3,184,191, granted May 18, 1965.

The box holders of my said patent are adapted to mount electrical wiring boxes in wallboard, and specifically, in an opening formed in the wallboard for that purpose.

Electrical wiring boxes, such as the familiar outlet and switch boxes that are adapted for wallboard mounting purposes, are commonly of polygonal and semipolygonal configuration, including a rear or back wall and a side wall structure in circumambient relation about the back wall margin to define the box interior that is open at the box front. The box side wall structure commonly includes at least two oppositely disposed side walls of rectilinear or straight wall configuration.

In applying these boxes to wallboard, the wallboard is formed with an opening closely matching the external configuration of the side wall structure of the box to be mounted. The box is disposed in such opening, ordinarily with the front of the box flush or substantially flush with the front face of the wallboard. It is necessary to have some type of fastening holding arrangement to secure the box in its mounted position within the indicated wallboard opening.

The holder arrangement of my said patent provides for holding of the box in the wallboard opening utilizing a pair of E shaped holder or securing devices that are applied to the opposite straight sides of the box. Each holder device is in the form of metal sheeting of one piece construction, in the general shape of a block letter E, and thus each holder defines a back portion and three extensions or legs extending from the same side of the back portion normally of same. The holder device is formed from aluminum or the like, of suitable gauge for bending as required, but having sufficient stiffness so that when a pair of such devices are applied to the box on either side of same, the box will be retained in the wallboard opening.

In the holder device of my said patent, assuming that the box to be mounted has been placed in the wallboard opening that has been formed to receive same, the devices are consecutively applied to the indicated opposite sides of the box, by being inserted, back portion first, between the box side wall to which the device is to be applied and the side edge of the wallboard opening that conforms to the box side in question, to dispose the holder device back portion well back of the wallboard back face and position the device legs to extend forwardly of the front of the box. The end legs of the device, as distinguished from its center leg, are then bent over the box side wall into the inside of the box and held in place with the fingers of one hand, after which the center leg is grasped with the other hand, or by a suitable tool held in the other hand, and pulled smartly outwardly of the box and away from the wallboard. This results in the holder device back portion being pulled forwardly against the back face of the wallboard, with the center leg leading the device back portion and confirming to the adjacent edge of the wallboard cutout; the two end legs fold in an identical manner to be wedged against the outer side surface of the box in question. The pulled out center leg projecting end is then trimmed off (to avoid possible contact with terminals later to be located in the box) with the remainder of the center leg projecting end being folded over the box edge in question in the same plane as the folded over ends of the holder end legs. Similar application of the second holder device on the other side of the box completes the mounting of the box in the wallboard opening.

While the holder device of my said patent when properly applied provides adequate securement of the box in its mounted position, the end legs of the holder device are wedged in aligned coplanar relation in an open V configuration, as indicated in FIGS. 5, 6 and 7 of my said patent. It has been found that if the box opening is made somewhat wider than need be, and if the device center leg is pulled too strongly, the V wedges formed by the end legs of the device can overfold at their verticeses and permit the holder to be pulled through the space between the wallboard edge and the box side to which the holder device is being applied.

A principal object of this invention is to improve the holder of my said patent so that the wedge structure it defines is shaped to have a girder like resistance to bending or deflection even though the holder itself in its unapplied form is of one piece relatively flat sheet metal construction.

Another principal object of the invention is to modify the holder of my said patent so that the application of same to the box side wall results in the holder defining a single reinforced wedge structure aligned with the device center leg that is firmly wedged between the box side wall and the back face of the wallboard to firmly resist dislodgement and/or unintended pulling of the holder device through the space between the box side wall and the wallboard opening in which the holder device is being applied.

Other objects of the invention are to revise the basic outline of the holder of my said patent for effecting the bending action on the device that is needed in application of the device to shape the basic sheet metal implement that is involved to form the indicated wedge structure, to provide an improved method of mounting electrical wiring boxes and wallboard utilizing the improved holder, and to provide a box holding arrangement that is economical of manufacture, convenient and effective in use, and applicable to a wide variety of box configurations.

In accordance with the invention, the center leg of the holder at its portion connecting same to the holder back portion is made of trapezoidal configuration defining center leg side portions that diverge in the direction of and merge into the holder back portion. Across the back portion and into the center leg connecting portion the holder is formed with a reinforcing rib or ridge in the form of an indentation that is rectilinear longitudinally thereof, and that is aligned with and parallels the center leg. At the foot of the holder center leg connecting portion, and at the juncture of same with the respective end legs of the holder, the holder is formed with an arcuate notch, with such notches thus being one on either side of the center leg connecting portion and intermediate same and the respective end legs at their juncture with the holder back portion. Similar notches are formed in the back margin of the holder back portion, one on either of and in close adjacency to, the median portion of the holder box portion where the indicated rib terminates. These notches are oriented for facilitating the bending of the holder back portion and center leg connecting portion, on application of the device in accordance with the method of this invention, to shape same to define the indicated reinforced wedge structure that is wedged between the box side wall and the wallboard back face in practicing the invention.

In the practice of this invention, it is the center leg that is to be held against the front edge of the box side wall, and it is the end legs of the holder that are to be pulled, one at a time, to set the holder back portion against the wallboard back face. The projecting end of the center leg for this purpose is made of a width that is on the order of twice the width of the corresponding ends of the end legs, for achieving the bearing area against the box edge to which it is applied that will hold the center leg straight with respect to the box against the unbalanced stresses applied to the holder that are induced by the consecutive pulling of the holder device end legs in practicing the invention.

Furthermore, as an aid for achieving proper orientation of the holder back portion for flexure away from the box and toward the wallboard back face, the holder is shaped to be essentially flat or planar in configuration, except for the aforementioned rib, and the center leg is given a flat angled positioning with respect to the holder end legs and back portion that results in the holder back portion being properly cocked away from the box on application of the holder center leg to the box side wall, to insure that the holder back portion swings in the proper direction on pulling of the holder end legs.

In utilizing the improved holder in practicing the method of the present invention, the wallboard is suitably formed with the usual opening to receive the box where the box is to be mounted in the wallboard. Two of the holder devices are required for each box and they are applied to oppositely disposed straight sides of the box and in a consecutive manner.

With the box positioned in the wallboard opening, the first holder is selected and inserted back portion first between the box side to which it is being applied and the corresponding edge of the wallboard opening, to dispose the holder back portion well back of the wallboard back face. The projecting end of the center leg is conveniently preformed to be doubled over for easy application to the front edge of the box side in question, with this application also orienting the holder back portion, due to the angulation of the center leg with respect to the remainder of the holder, for proper movement against the wallboard back face.

The assembler then holds the holder center leg against the box edge and successively firmly pulls the outwardly projecting ends of the end legs outwardly of the wall, to seat the holder back portion against the back face of the wallboard.

This actuation of the holder member effects a bending of the holder back portion and center leg connecting portion about the reinforced rib as an axis to shape the mid portion of the holder into a dihedral wall configuration that is reinforced along the apex of same by the indicated rib.

Furthermore, the holder back portion bends on either side of the dihedral wall structure involved, between the notches that are interposed between the center and end legs and the rear marginal edge of the holder back portion adjacent the indicated reinforcing indentation, to shape the holder back portion into a pair of angled bracing feet on either side of the holder reinforcing bracing structure.

The second holder member is processed in like manner on the other side of the box, which leaves the box firmly secured and mounted in the wallboard opening free of screw type connection to the wallboard.

Other objects, uses, and advantages will be obvious or become apparent from a consideration of the following detailed description and the application drawings.

However, it is to be distinctly understood that the specific drawing illustrations provided are supplied primarily to comply with the requirements of the Patent Laws, and that the invention may have other embodiments that will be obvious to those skilled in the art, and which are intended to be covered by the appended claims.

Figure 1:
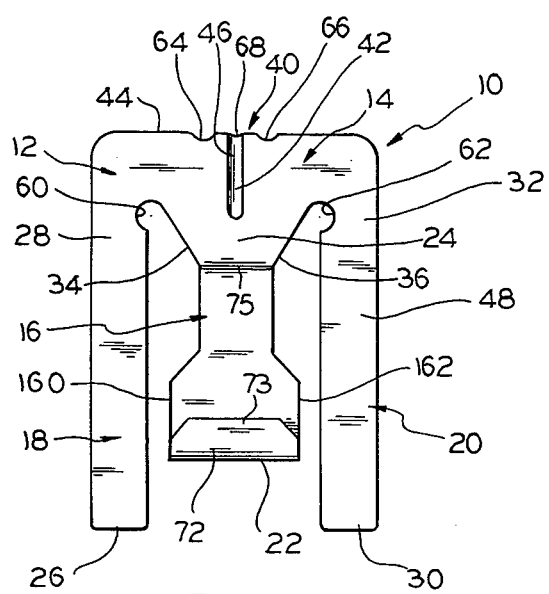
FIG. 1 is a plan view of the box holder arranged in accordance with the present invention.
Figure 2:
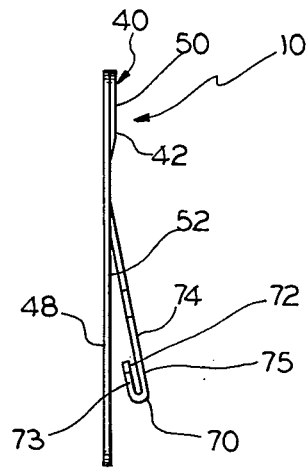
FIG. 2 is a side edge view of the device shown in FIG. 1, taken from the right hand side of same.

Reference numeral 10 of FIGS. 1 and 2 generally indicates the box holder member or fastening device of this invention, which generally comprises a sheet metal body 12 generally shaped in the form of the block letter E and defining back portion 14, center leg or extension 16 and end legs or extensions 18 and 20 disposed on either side of the center leg 16. The center leg 16 defines projecting end 22 and connecting portion 24 that is integral with the body back portion 14. End leg 18 defines projecting portion 26 and connecting portion 28 that is integral with the body back portion 14, while end leg 20 defines projecting portion 30 and connecting portion 32 that is integral with the body back portion 14.

In accordance with the present invention, the center leg connecting portion 24 is of trapezoidal configuration defining side edges 34 and 36 that diverge in the direction of the body back portion 14 in an equal angulation manner.

The back portion 14 of body 12 in accordance with the invention, is formed with reinforcing or stiffening rib or ridge 40 that is rectilinear longitudinally thereof and centered along the longitudinal center of the center leg 16. The rib or ridge 40 thus parallels the center leg 16 and as indicated in FIG. 1, extends into the center leg connecting portion 24.

In the specific holder 10 as illustrated, the rib or ridge 40 is in the form of elongate indentation 42 that is of concavo-convex configuration and extends from the back margin 44 of the body 12 well into the center leg connecting portion 24.

In the form of FIGS. 1–7, the indentation 42 has its concave side 46 on the box facing side 48 of the body 12, and its convex side 50 on the wallboard facing side 52 of the body 12.

Further in accordance with the invention, the body 12 intermediate the center leg connecting portion 24 and the connecting portions 28 and 32 of the respective end legs 18 and 20 is shaped to define the respective rounded notches 60 and 62, which are thus disposed at the foot of the center leg connecting portion 24. In addition, the back margin 44 of the body back portion 14 is formed with a pair of rounded notches or cutouts 64 and 66 that are disposed closely adjacent to the end 68 of the rib or ridge 40 that is at the body back portion back margin 44.

Further in accordance with the invention, the center leg projecting portion 22 has its width of an enlarged nature and is shaped to define the reverse bend 70 forming hooked end portion 72 that is to receive the box side wall in the manner indicated in FIG. 3 (as will be described). The center leg extending portion 22 thus defines an enlarged head portion 74 and that is to have a width that is preferably on the order of double the width of the respective end legs 18 and 20 (horizontally of the showing of FIG. 1). The end portion 72 should have a spacing between its tab portion 73 and its panel portion 75 of about 0.070 inch for steel boxes.

Further in accordance with the invention, the body 12 is generally flat or planar in configuration, instead of being arced (as disclosed in my said patent) with the center leg 16 being angled, as at bend line 75, at a flat angle with respect to the basic plane of body 12, as best indicated in FIG. 2. Preferably this angulation is on the order of 10 degrees, and it disposes the center leg hook portion 72 to one side of the body wallboard facing side 52.

The body 12 may be fabricated in any suitable manner, from a suitable sheet metal material such as steel, copper, aluminum or the like of a suitable gauge. In the preferred form, the body 12 is formed from aluminum; I have found that aluminum sheeting of 0.012 inch thickness is particularly suitable when employing aluminum. However, it will be apparent that the selection of the material and gauge employed is a matter of choice and design for the engineer to decide, depending on the application.

The manner of utilizing the holders 10 is as follows, referring now more particularly to FIGS. 3 and 4:

As indicated, the holders 10 are used in pairs to mount electrical wiring boxes, such as the box indicated at 90, in their operative positions on wallboard, such as the wallboard indicated at 92. Wallboard ordinarily encountered in practice will range from paneling having a thickness of one quarter inch to wall stock having a thickness of one and one-quarter inches. The wallboard 92 in the practice of the invention is ordinarily already in place as this invention is basically concerned with applying boxes to what is known in this art as "old work."

When the location of the box 90 in its operative position has been determined, the wallboard opening 94 is formed in the usual manner. The opening 94, following conventional practice, is shaped to closely conform to the general outline of the box side wall structure.

In the specific box 90 that is illustrated, the box is of the switch mounting type and defines back wall 96, opposed wide side walls 98 and 100, and opposed narrow side walls 102 and 104. The box side walls are disposed about the margin of the back wall 96 in any suitable manner and form side wall structure 106 that is in circumambient relation about the box back wall 96 to define the box chamber 108 in which the usual electrical connections are made to wiring that may be brought into the box chamber through the customary knockouts, one of which is shown at 109 in FIG. 5.

The box 90 is shown to include the usual plaster ears 110 and 112 that prevent movement of the box beyond the flush wall position by engagement with the front face 114 of the wallboard, as distinguished from the back face 116 of the wallboard. The box switch mounting ears are shown at 115.

It will thus be seen that in the box 90 that is illustrated, the wallboard opening 94 in configuration follows the basic outline of the box side wall structure 106, and in view of the presence of the plaster ears 110 and 112 on this particular box, the holders 10 for securing the box 90 within the opening 94 are applied to the box wide sides 98 and 100.

Figure 3:
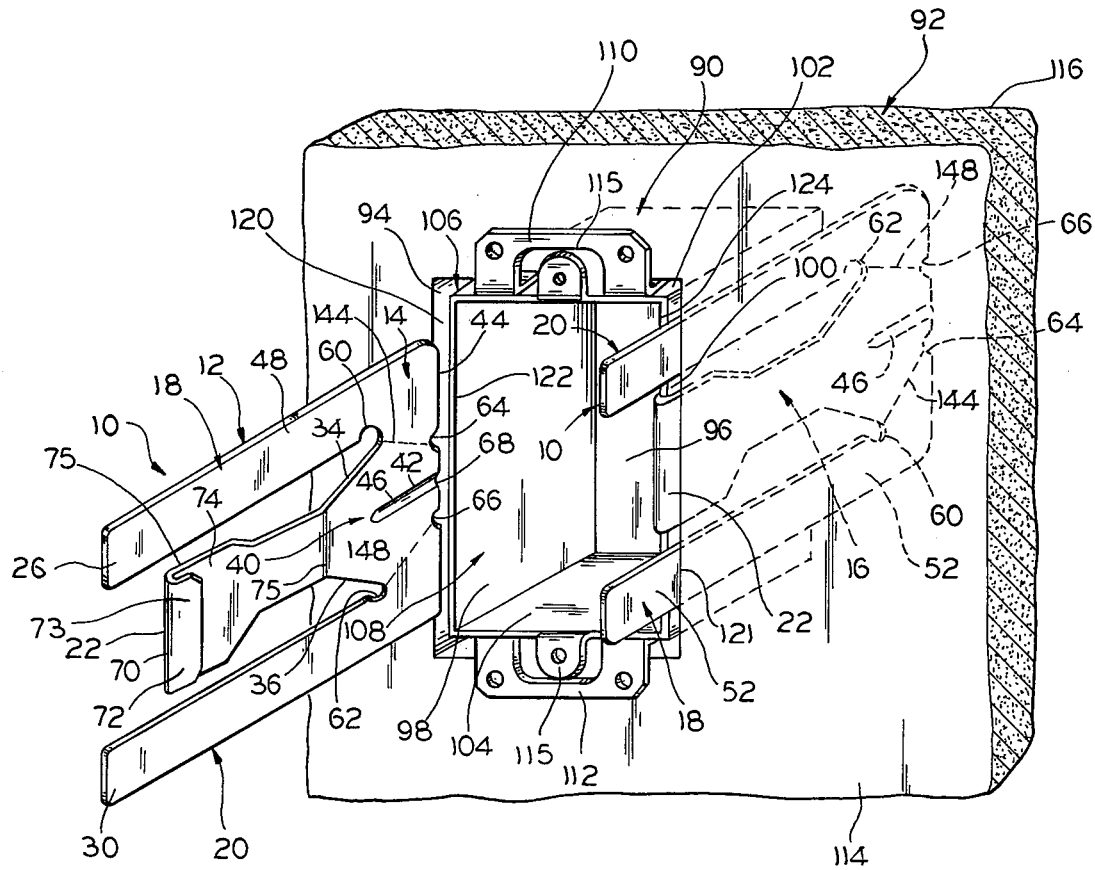
FIG. 3 is a diagrammatic perspective view illustrating the manner in which the holders of this invention are applied to the box and wallboard in the initial processing of the holder in accordance with the invention.
Figure 4:
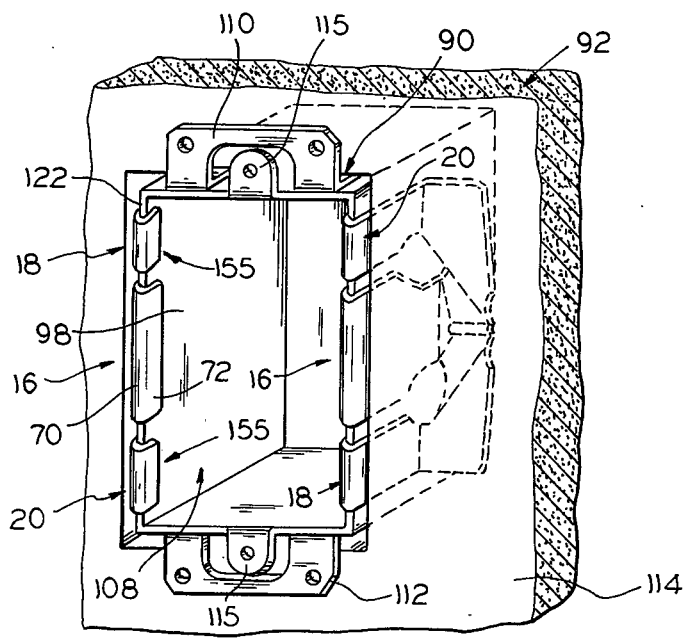
FIG. 4 is a view similar to that of FIG. 3 but illustrating the box as supported in the wallboard opening by the practice of the invention.

Assuming that the box 90 is applied to the wallboard opening 94 with the plaster ears 110 and 112 bearing against the wallboard front face 114, the holder devices or members 10 are initially applied in the manner indicated in FIGS. 3 and 4, first on one side of the box and then on the other side of the box.

In this connection, in the showing of FIG. 3, the left hand holder device 10 is illustrated as it is about to be inserted in its operating position and for purposes of description it will be assumed that this holder is to be applied first (although the other holder 10 could be applied first if so desired). For this purpose, the holder 10 in question is oriented so that its box facing side 48 faces the side of the box it is to be applied to, which in this case is box side 98. This disposes the left hand holder 10 oppositely of the position indicated in FIG. 2, so that the center leg 16 due to its angulation with respect to the plane of the body 12, will be projecting away from the box side 98. The left hand holder 10 as so disposed is then approximately centered with respect to the box side wall and then has its back portion 14 inserted between the box side wall and the side 120 of the opening 94 opposing same. The left hand holder member 10 is then moved inwardly to dispose the holder back portion 14 well rearwardly of the wallboard back face 116; as the hooked end portion 72 of the center leg approaches the outer edge 122 of box wall 98, the center leg extending portion 22 is flexed toward box wall 98 so as to seat the box wall edge 122 within the hooked end portion 72, as indicated in FIG. 4. This bending action on the left hand holder member 10 induces a reverse bending of the body 12 that tends to angle the back portion 14 away from the box side wall 98 to insure that when the holder device end legs 18 and 20 are utilized as is about to be described, the holder back portion 14 moves toward the wallboard back face 116 in the area of the wallboard opening side 120.

The showing of the right hand holder 20 in FIG. 3 illustrates the manner in which the left hand holder should be positioned when the left hand holder has been fully inserted into its operating position and has its hooked end portion 72 applied to the box side wall edge 122. It is to be noted at this point that an additional function of the holder hooked end portion is to serve as a "stop" limiting movement of the holder inwardly of opening 94.

Figure 6:
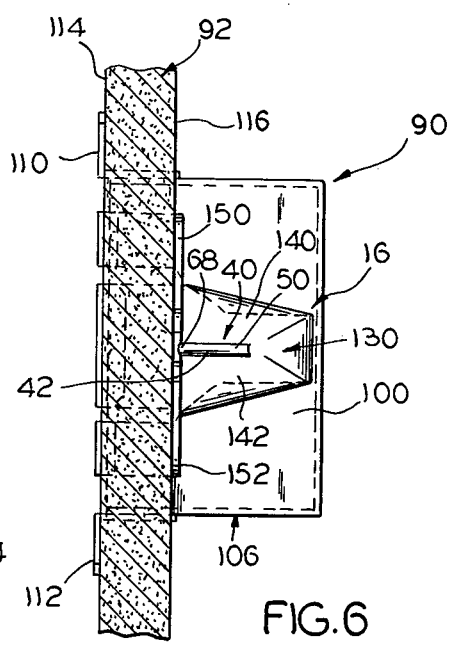
FIG. 6 is an elevational view of the arrangement shown in FIG. 5, taken from the right hand side of same.
Figure 5:
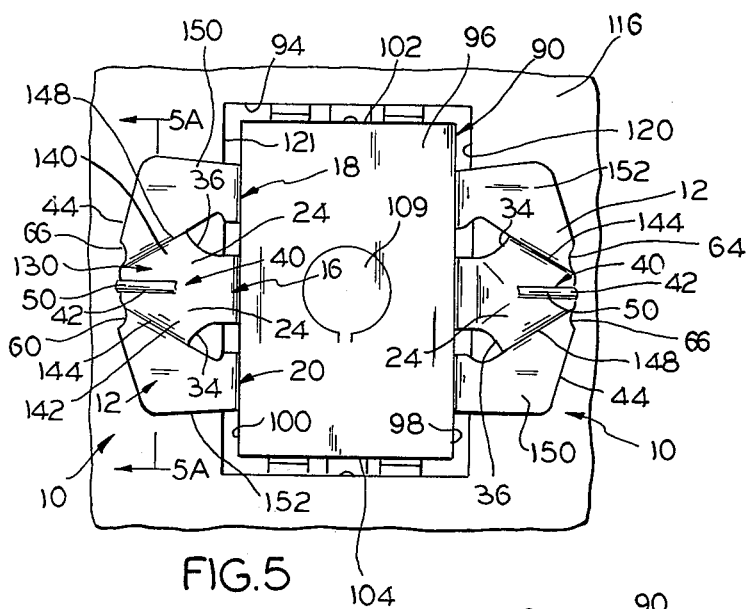
FIG. 5 is a rear elevational view of the arrangement shown in FIG. 4, more particularly illustrating the special dihedral wall bracing structure into which the back and center leg connecting portions are shaped by the practice of the invention.
Figure 8:
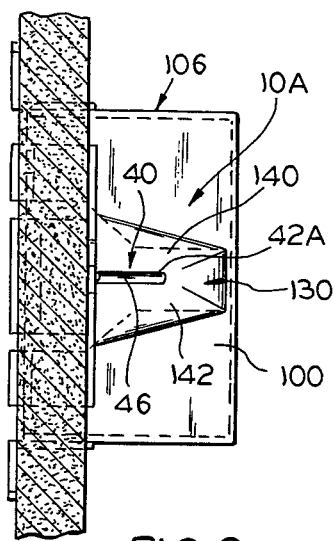
FIG. 8 is a view similar to that of FIG. 6 but illustrating a slightly modified form of the invention.
Figures 5A, 7:
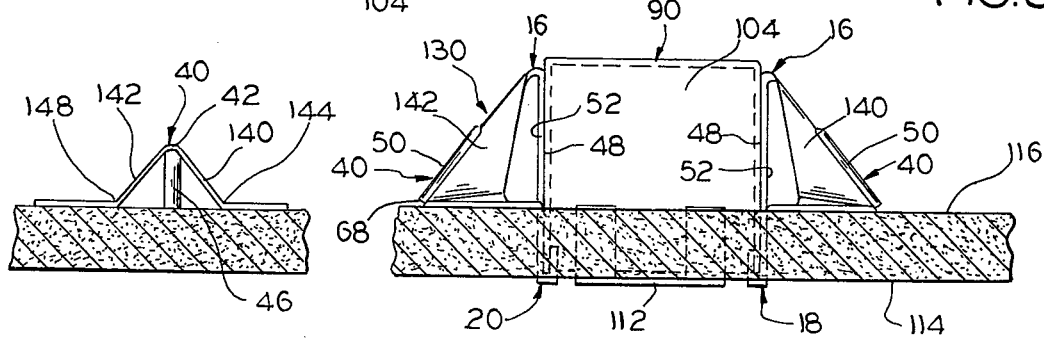
FIG. 5A is a fragmental sectional view taken substantially along line 5A—5A of FIG. 5.
FIG. 7 is an elevational view taken from the lower side of FIG. 5.

Thereupon, the installer then holds the left hand holder center leg hook portion 72 against the box edge 122 with one hand using finger pressure, and with the other hand grasps first one of the end legs 18 and then the other end leg 20, at the respective outwardly extending portions 26 and 30 of same, and pulls them (first one and then the other) smartly away from the wallboard 92, which results in the reforming of the holder member 10 in the special way that is indicated in FIGS. 5, 6 and 7 to obtain the dihedral wall bracing structure indicated at 130.

In this connection, it is a feature of the invention that the holder body 12 is shaped such that as the end legs 26 and 30 are consecutively pulled under the conditions indicated, the body 12 in the area of its back portion 14 and center leg connection portion 24 bends or angulates about the rib or ridge 40 as a center, first on one side of the same, for instance as end leg 18 is pulled, and then on the other side of same, as end leg 20 is pulled, to fold the body 12 along the rib or ridge 40 such that angled bracing walls 140 and 142 are formed in the holder back portion 14 and center leg connecting portion 24.

Additionally, the notches 60 and 64, and notches 62 and 66, so shape the body back portion 14 that the respective bend lines 144 and 148 are formed, about which the angled walls 142 and 144 respectively are bent out of the plane of the body 12. This results in the holder body back portion 14 being subdivided into a pair of spaced apart flat or planar feet or bracing flanges 150 and 152. It will be noted also that the feet or bracing flanges 150 and 152 when fully shaped after the completion of the pulling action on both the holder end legs 18 and 20 are turned or cocked somewhat toward each other in the direction of the box wall to which the holder 10 is applied.

This procedure with regard to the first holder 10 leaves its end legs 18 and 20, and specifically their projecting portions 26 and 30, extending forwardly of the front face 114 of the wallboard 92 and well beyond the box wall edge 122. The end legs 18 and 20 are now trimmed to approximately the length indicated in FIG. 4 and folded over the edge 122 of the box in the manner indicated at 155 in FIG. 4 to complete the application of the first holder 10.

The application of the second holder 10 on the other side of the box in connection with the box wall 100 its outer edge 124, and the opening side 121 is completed in like manner with the result that the box is firmly held in place by two holders 10.

The holder rib or ridge 40 has the function of providing an elongate reinforcement extending across the longitudinal center of the holder, and specifically its back portion 14 and well into the center leg connecting portion 24, that acts in the nature of a girder in resisting bending, and that also serves the function of forming the bend axis about which the reinforcing and bracing angled walls 140 and 142 are formed. The result is the provision of the diagonally oriented rigid dihedral wall structure 130 that is in effect wedged between the respective box side walls on either side of the box and the wallboard back face 116. The angulation of the dihedral angle involved will depend on the specific shaping of the parts involved and the fit of the box within opening 94. However, this angulation preferably lies in the range of from about sixty degrees to about one hundred twenty degrees for best results.

In addition, the angulation of the feet or bracing flanges 150 and 152 sets them against the wallboard back face in a manner to better resist forces tending to unseat the holder back portion.

The rounded nature of the notches 60, 62, 64 and 66 also has the function of facilitating the bending action indicated without tearing of the metallic material making up the holder.

As already indicated, the relatively wide projecting portion 22 of the center leg makes for a long area of contact with the box wall outer edge (edge 122 or 124) which induces maintenance of correct alignment of the center leg with respect to the box wall to which the holder is being applied while the holder is being applied. In addition, the side edges 160 and 162 of the center leg extending portion 22 serve as guides for the outward pulling of the two end legs 18 and 20, as well as for the application of the trimmed off end portions of same to the box wall, where, as indicated in FIG. 4, the shortened end portions are folded over the box outer edge in coplanar relation with the hook portion 72 of the holder center leg.

As also previously indicated, it is not material which way the convex or concave portion of the indentation 42 faces, as the function performed is the same. In the embodiment of FIG. 6, the indentation 42A faces oppositely of the indentation 46. Otherwise, the holder 10A of FIG. 6 is the same as holder 10.

The holders in the forms illustrated are proportioned to be applied to wallboard forming materials ranging in thickness from about one-quarter inch to about one and one-quarter inches. Thicker wall forming materials can be accommodated by increasing the length of the holder arms. If so desired, the holder end arms 18 and 20 may be suitably marked or formed to indicate appropriate cut off or break off positions for the different thicknesses of wall forming materials that may be encountered. The cutting off may be effected by using side clippers or tin snips, or even by hand bending action. Of course, the size and shaping of opening 94 will vary with the size and shape of the box to be mounted.

While the holder end legs 18 and 20 in applying the holder as described are readily pulled, for proper shaping of the holder in its applied form, by hand, it will be apparent that a pair of pliers or the like may optionally be employed for this purpose.

It will therefore be seen that the invention provides a box holder arrangement for trouble free application of boxes to wallboard without having to be concerned with screw fasteners or even fastening hand tools. When the holders are applied to the box in the manner indicated and described, the box will be firmly held in position from to opposite sides of same, with the structurally reinforced and angularly dihedral wall structues 130 firmly braced or wedged between the respective box walls and the wallboard back face.

The holders of this invention may be applied to any box having wallboard engaging stops or ears comparable to ears 110 and 112 (so that the box may be held against the front face of the wallboard in processing the holders), and a pair of opposed side walls comparable to box side walls 98 and 100.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A holder arrangement for supporting an electrical wiring box in wallboard in an opening formed in the wallboard proportioned to closely receive the box in which the wallboard defines front and back faces on either side of same and the box defines a back wall and a side wall structure including a pair of opposed side walls upstanding from the box back wall, with said wall structure being arranged in closed perimeter relation about the margin of the box back wall to define the interior of the box and the open front of the box, with said holder arrangement comprising a holder member of E shaped general configuration defining a back portion and three legs projecting from said back portion from the same edge of the back portion and comprising a center leg and a pair of end legs disposed on either side of the center leg, with the holder member being proportioned to be slipped between the box, when received in the wallboard opening with its open front facing forwardly, and one edge of the opening corresponding to one of the box side walls, for disposing the holder member back portion rearwardly of the wallboard back face and the projecting end portions of the holder member legs in forwardly projecting relation, and for folding over the outer marginal edge of said one box side wall, for seating of the holder member back portion against the wallboard back face, together with a like holder member similarly applied between the box and the edge of the wallboard opening that corresponds to the box side wall opposing said one box side wall, hold the box in the opening, the improvement wherein said holder member comprises:

said center leg at its portion connecting same to the holder member back portion being of trapezoidal configuration defining side edge portions that diverge in the direction of the member back portion, said holder member having a stiffening rib extending across said back portion thereof and into said center leg connection portion, said rib substantially paralleling said center leg portion, whereby when the holder member projecting end portion is folded over and held against the marginal edge of said box one side wall, and the holder member end legs are consecutively pulled forwardly of the box, the holder member back portion is seated against the wallboard back face with said center leg connecting portion seated diagonally against the box one side wall and bent about said rib to define a dihedral wall bracing structure.

2. The improvement set forth in claim 1 wherein:

said member is notched at the foot of said center leg connecting portion and intermediate same and the respective end legs for facilitating bending of said holder member back portion between said notches and at bend points on the other edge of the holder member back portion in substantial alignment with said rib to define the holder member back portion into substantially coplanar seating flanges on either side of said dihedral wall structure bearing against the wallboard back face when said dihedral wall bracing structure is defined.

3. The improvement set forth in claim 2 wherein:

said holder member is further notched at said other edge of the holder member back portion adjacent to and on either side of said rib to define said points thereon and further facilitate said bending of said holder member back portion.

4. The improvement set forth in claim 2 wherein:

said center leg at said projecting end portion of same has a width to dispose its side edges in close guiding relation to the corresponding opposed edges of the end legs for facilitating bending over of said projecting end portions of said legs, over said outer marginal edge of said one box side wall, in coplanar relation.

5. The improvement set forth in claim 4 wherein:

said width of said center leg projecting end portion is approximately twice the corresponding width of said end leg projecting end portions.

6. The improvement set forth in claim 1 wherein:

said holder member prior to said pulling of said end legs is shaped to have said end legs and said back portion in coplanar relation, with said center leg angled with respect thereto at an angle on the order of ten degrees with respect thereto, and with said center leg projecting end being formed with a reverse bend to one side of the holder member to receive the outer marginal edge of said one box side wall, said angulation of said center leg being to the other side of said holder member.

7. The improvement set forth in claim 1 wherein:

said center leg connecting portion and said back portion are proportioned such that said dihedral wall bracing structure will define a dihedral angle lying in the range of from about sixty to about one hundred twenty degrees when said dihedral wall structure is defined.

8. A holder arrangement for supporting an electrical wiring box in wallboard in an opening formed in the wallboard proportioned to closely receive the box in which the wallboard defines front and back faces on either side of same and the box defines a back wall and a plurality of pairs of opposed side walls upstanding from the box back wall, with said walls being arranged in closed perimeter relation about the margin of the box back wall to define the interior of the box and the open front of the box, with said holder arrangement comprising a pair of holder devices each comprising holder member of E shaped general configuration defining a back portion and three legs projecting from said back portion from the same edge of the back portion and comprising a center leg and a pair of end legs disposed on either side of the center leg, with the holder member of each device being proportioned to be slipped between the box, when received in the wallboard opening with its open front facing forwardly, and corresponding mounting edges of the opening corresponding to the box side walls to be held by said devices, for disposing the respective holder device back portions rearwardly of the wallboard back face and the projecting end portions of the holder device legs in forwardly projecting relation, and for folding over the outer marginal edge of said held box side walls for seating of the respective holder device back portions against the wallboard back face to hold the box in the opening, the improvement wherein each said holder member comprises:

said center leg at its portion connecting same to the holder member back portion being of trapazoidal configuration defining side edge portions that diverge in the direction of the member back portion, said holder member having a stiffening rib extending across said back portion thereof and into said center leg connection portion, said rib substantially paralleling said center leg portion, whereby when, for each holder device, the holder member projecting end portion is folded over and held against the marginal edge of said box one side wall, and the holder member end legs are consecutively pulled forwardly of the box, the holder member back portion is seated against the wallboard back face with said center leg connecting portion seated diagonally against the box one side wall and bent about said rib to define a dihedral wall bracing structure, whereby the box is firmly held in the opening between said devices free of screw connection to the wallboard.

9. The improvement set forth in claim 8 wherein, for each holder device:

said member is notched at the foot of said center leg connection portion thereof on either side of said center leg connecting portion and intermediate same and the respective end legs for facilate bending of said holder member back portion between said notches and at bend points on the other edge of the holder member back portion in substantial alignment with said rib to define the holder member back portion into substantially coplanar seating flanges on either side of said dihedral wall structure bearing against the wallboard back face when said dihedral wall bracing structure of each holder device is defined.

10. The improvement set forth in claim 8 wherein, for each holder device:

said center leg connection portion and said back portion are proportioned such that said dihedral wall bracing structure thereof will define a dihedral angle lying in the range of from about sixty to about one hundred twenty degrees when said dihedral wall structure is defined.

11. The method of mounting an electrical wiring box in wallboard in an opening formed in the wallboard proportioned to closely receive the box in which the wallboard defines front and back faces on either side of same and the box defines a back wall and a side wall structure including a pair of opposed side walls upstanding from the box back wall, with said wall structure being arranged in closed perimeter relation the margin of the box back wall to define the interior of the box and the open front of the box, utilizing a holder arrangement comprising a holder member of E shaped general configuration defining a back portion and three legs projecting from said back portion from the same edge of the back portion and comprising a center leg and a pair of end legs disposed on either side of the center leg, with the holder member being proportioned to be slipped between the box, when received in the wallboard opening with its open front facing forwardly, and one edge of the opening corresponding to one of the box side walls, for disposing the holder member back portion rearwardly of the wallboard back face and the projecting end portions of the holder member legs in forwardly projecting relation, and for folding over the outer marginal edge of said one box side wall, for seating of the holder member back portion against the wallboard back face to, together with a like holder member similarly applied between the box and the edge of the wallboard opening that corresponds to the box side wall opposing said one box side wall, hold the box in the opening, the improvement wherein said method comprises consecutively processing the holder members as follows:

after the holder member is positioned in the wallboard opening to dispose the holder member back portion rearwardly of the wallboard back face, the projecting end portion of the center leg is applied over the marginal edge of said one box sidewall, then, on holding the projecting end portion of the center leg against the box, consecutively pulling first one and then the other of the holder member end legs forwardly of the box to flatten the ends of the holder member back portion against the wallboard back face and dispose the midportion of the holder member back portion in dihedrally shaped bracing relation between the side wall of the box and the wallboard back face, then trimming the outwardly extending portions of the holder member end leg projecting portions short of the box marginal edge and bending same over the edge against the inside of the box in alignment with the projecting end portion of the center leg.

* * * * *